(12) United States Patent
Lu et al.

(10) Patent No.: US 12,148,333 B2
(45) Date of Patent: Nov. 19, 2024

(54) PROJECTION METHOD, EXTENDED REALITY DEVICE AND STORAGE MEDIUM

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Jun-Jie Li, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 158 days.

(21) Appl. No.: 17/987,797

(22) Filed: Nov. 15, 2022

(65) Prior Publication Data
US 2023/0083545 A1     Mar. 16, 2023

(30) Foreign Application Priority Data
Aug. 26, 2022 (CN) .......................... 202211033286.4

(51) Int. Cl.
*G06T 19/00* (2011.01)
*G06V 10/44* (2022.01)
*G09G 3/00* (2006.01)

(52) U.S. Cl.
CPC .......... *G09G 3/003* (2013.01); *G06V 10/443* (2022.01)

(58) Field of Classification Search
CPC .. G06T 19/006; G09G 5/377; G09G 2340/12; G09G 5/38; G09G 3/002; G09G 5/14; G06F 2203/04804; G06F 3/011; G06V 20/20
See application file for complete search history.

(56) References Cited

U.S. PATENT DOCUMENTS

2016/0216521 A1* 7/2016 Yachida ............. G01C 21/3602
2019/0392640 A1* 12/2019 Qian ....................... G06F 3/013

FOREIGN PATENT DOCUMENTS

CN    111833458 A    10/2020
CN    114328998 A    4/2022

* cited by examiner

*Primary Examiner* — Hau H Nguyen
(74) *Attorney, Agent, or Firm* — ScienBiziP, P.C.

(57) ABSTRACT

A projection method is provided. The method includes acquiring an image of a real scene using the camera. A target object is identified from the image of the real scene, and a target area is determined according to the target object. In response to a projection command, a projection content of a virtual scene is acquired. The projection content or a part of the projection content is projected outside the target area using a projection device.

17 Claims, 8 Drawing Sheets

PROJECTION METHOD, EXTENDED REALITY DEVICE AND STORAGE MEDIUM

FIELD

The present disclosure relates to the technical field of extended reality, and in particular, to a projection method, an extended reality device, and a storage medium.

BACKGROUND

Extended reality (XR) refers to a combination of a real scene and a virtual scene to construct a virtual environment that enables an interaction between a person and a machine. Currently, when an extended reality device receives a projection content of a virtual scene, the projection content of the virtual scene is superimposed on an image of a real scene, so that a part of the image of the real scene is blocked by the projection content of the virtual scene. When the projection content of the virtual scene blocks an object in the image of the real scene that a user is paying attention to or that requires the user's attention, a user experience is degraded, and even a personal safety of the user may be endangered.

For example, when a user uses an extended reality device while driving a vehicle, if the projection content of the virtual scene blocks a vehicle and/or pedestrians on a road in the image of the real scene, a risk of a traffic accident is increased.

DETAILED DESCRIPTION

It should be noted that, in the embodiments of the present disclosure, "at least one" refers to one or more, and "a plurality of" refers to two or more. "And/or", which describes a relationship between associated objects, means that there can be three relationships, for example, A and/or B can mean: A alone exists, A and B exist at the same time, and B exists alone, where each of the A and B can be singular or plural. The terms "first", "second", "third", "fourth", etc. (if any) in the description and claims of the present disclosure and the drawings are used to distinguish similar objects, and are not used to describe a particular order or sequence.

In addition, it should be noted that the methods disclosed in the embodiments of the present disclosure or the methods shown in the flowcharts include one or more blocks for implementing the methods, and the one or more blocks are not deviated from the scope of the claims. The order of execution can be interchanged with each other, and some of the one or more blocks can also be deleted.

The extended reality device provided by the present disclosure will be briefly described below.

Figure 1:
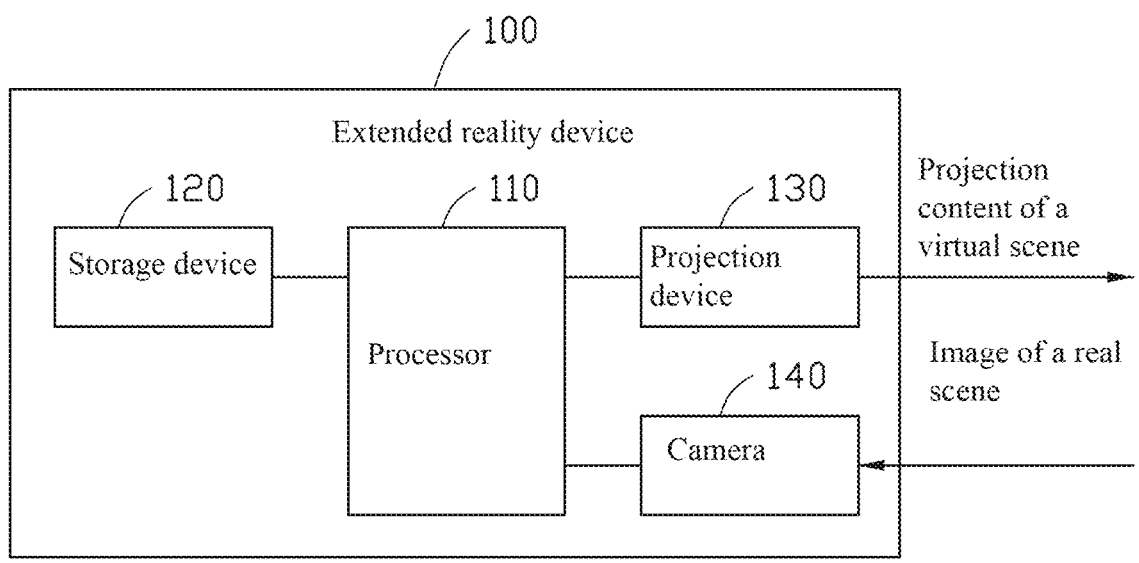
FIG. 1 is a schematic structural diagram of one embodiment of an extended reality device provided by the present disclosure.

FIG. 1 is a schematic structural diagram of one embodiment of an extended reality device 100 provided by the present disclosure.

As shown in FIG. 1, the extended reality device 100 includes a processor 110, a storage device 120, a projection device 130 and a camera 140. The processor 110 is electrically connected to the storage device 120, the projection device 130 and the camera 140. The processor 110 may execute one or more computer programs or program codes stored in the storage device 120 to implement the projection method of the embodiment of the present disclosure.

The processor 110 may include one or more processing units. For example, the processor 110 may include, but is not limited to, an application processor (AP), a modem processor, a graphics unit (GPU), an image signal processor (ISP), a controller, a video codec, a digital signal processor (DSP), a baseband processor, a neural-network processing unit (NPU), etc. Wherein, different processing units may be independent devices, or may be integrated in one or more processors.

A storage device may also be provided in the processor 110 for storing instructions and data. In some embodiments, the storage device in the processor 110 is a cache memory. This storage device may store instructions or data that have just been used or recycled by the processor 110. If the processor 110 needs to use the instructions or data again, the instructions or data can be called directly from this storage device.

In some embodiments, the processor 110 may include one or more interfaces. The one or more interfaces may include, but is not limited to, an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, etc.

It can be understood that interface connection relationships between components illustrated in the embodiments of the present disclosure are only schematic illustrations, and do not constitute a structural limitation of the extended reality device 100. In other embodiments, the extended reality device 100 may also adopt different interface connection manners in the foregoing embodiments, or a combination of a plurality of interface connection manners.

The storage device 120 may include an external storage device interface and an internal storage device. The external storage device interface can be used to connect an external storage device card, such as a Micro SD card, to improve a storage capacity of the extended reality device 100. The external storage device card communicates with the processor 110 through the external storage device interface to realize a data storage function. The internal storage device may be used to store computer-executable program codes including instructions. The internal storage device may include a program storage area and a data storage area. The program storage area can store an operating system, an application program required for at least one function (for example, a shooting function, a projection function, an image playback function, etc.), and the like. The data storage area may store data (e.g., image data, projection data, etc.) created during the use of the extended reality device 100 and the like. In addition, the internal storage device may include a high-speed random access storage device, and may also include non-volatile storage device, such as at least one magnetic disk storage device, flash memory device, or a universal flash storage (UFS), or the like. The processor 110 executes various functional applications and data of the extended reality device 100 by executing instructions stored in the internal storage device and/or the instructions stored in the storage device provided in the processor 110, such as realizing the projection method of the embodiments of the present disclosure.

The projection device 130 is used to project images. Specifically, the projection device 130 may acquire an image of a virtual scene from the processor 10 or the storage device 120 or an external device (not shown in the figure), and then project the image of the virtual scene.

Wherein, the external device may include a smart phone, a tablet computer, a personal computer (PC), an e-book reader, a workstation, a server, a personal digital assistant (PDA), a portable multimedia player (PMP) etc.

It can be understood that the extended reality device 100 can connect and communicate with the external device through a wireless communication module, so as to obtain the image of the virtual scene from the external device through the projection device 130.

The camera 140 is used to capture images. Specifically, the extended reality device 100 may capture images of a real scene using the camera 140. In some embodiments, the extended reality device 100 may include one or more cameras 140.

It can be understood that the structures illustrated in the embodiments of the present disclosure do not constitute a specific limitation on the extended reality device 100. In other embodiments, the extended reality device 100 may include more or fewer components than shown, or combine some components, or separate some components, or a different arrangement of components. The illustrated components may be implemented in hardware, software, or a combination of software and hardware.

It can be understood that the extended reality device 100 may include an augmented reality (AR) device, a virtual reality (VR) device, or a mixed reality (MR) device. For example, the extended reality device 100 may include, but is not limited to, AR/VR/MR head mounted display devices, AR/VR/MR glasses, AR/VR/MR helmets, and the like.

The following describes application scenes of the present disclosure by taking a first scene and a second scene as examples.

Figure 2A:
FIG. 2A is a schematic diagram of one embodiment of a real scene in a first scene.
Figure 2B:
FIG. 2B is a schematic diagram of one embodiment of the real scene in the first scene superimposed on a virtual scene.

First Scene:

FIG. 2A and FIG. 2B are schematic diagrams of one embodiment of the first scene.

Specifically, FIG. 2A is a schematic diagram of one embodiment of a real scene. The extended reality device 100 may capture an image of a real scene using the camera 140 to obtain the image of the real scene. As shown in FIG. 2A, the real scene includes a people that a user is paying attention to.

FIG. 2B is a schematic diagram of the real scene superimposed on a virtual scene. The extended reality device 100 may acquire a projection content of the virtual scene from the processor 110 or the storage device 120 or the external device through the projection device 130, and then project the projection content of the virtual scene through the projection device 130. As shown in FIG. 2B, the projection content of the virtual scene includes a message prompt box, and the message prompt box blocks the people that the user is paying attention to.

Figure 3A:
FIG. 3A is a schematic diagram of one embodiment of a real scene in a second scene.
Figure 3B:
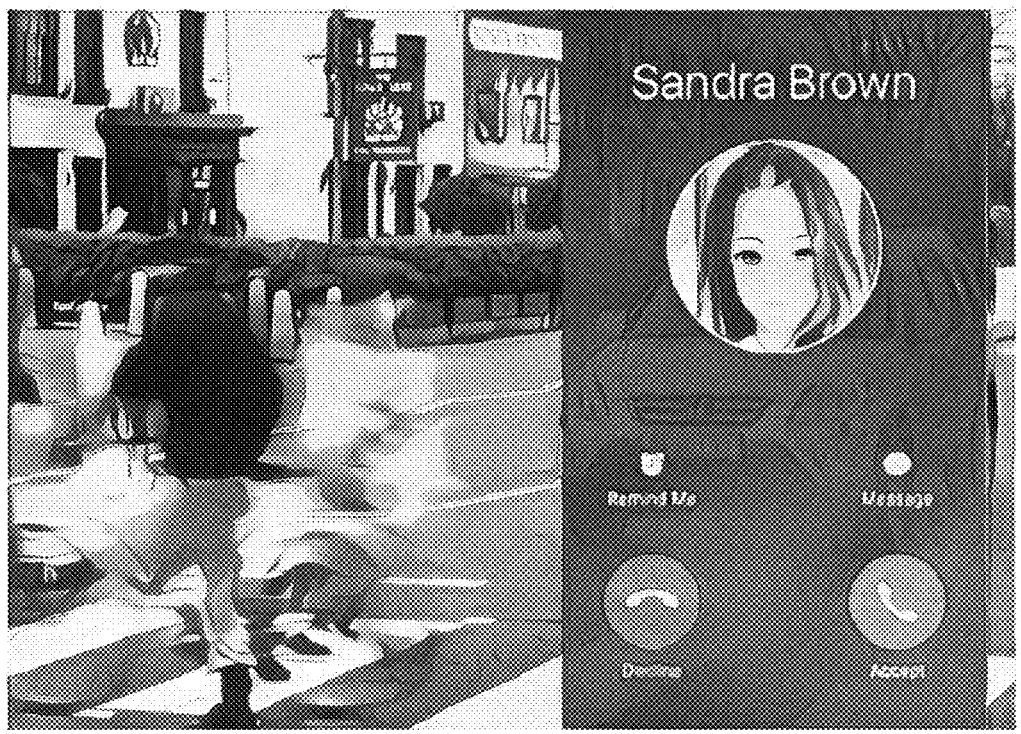
FIG. 3B is a schematic diagram of one embodiment of the real scene in the second scene superimposed on a virtual scene.

Second Scene:

FIG. 3A and FIG. 3B are schematic diagrams of one embodiment of the second scene.

Specifically, FIG. 3A is a schematic diagram of a real scene. The extended reality device 100 may capture an image of a real scene using the camera 140 to obtain the image of the real scene. As shown in FIG. 3A, the real scene includes a vehicle and a pedestrian on a road.

FIG. 3b is a schematic diagram of one embodiment of the real scene superimposed on the virtual scene. The extended reality device 100 may acquire a projection content of the virtual scene from the processor 110 or the storage device 120 or the external device through the projection device 130, and then project the projection content of the virtual scene through the projection device 130. As shown in FIG. 3b, the projection content of the virtual scene includes an incoming call alert box, and the incoming call alert box blocks the vehicle on the road that the user needs to pay attention to.

It can be seen from the first scene and the second scene that when the extended reality device 100 receives the projection content of the virtual scene, the extended reality device 100 superimposes the projection content of the virtual scene on the image of the real scene, so that a part of the image of the real scene is blocked by the projection content of the virtual scene. When the projection content of the virtual scene blocks the object that the user is paying attention to or needs to pay attention to in the image of the real scene, the user's use experience is degraded, and even the personal safety of the user is endangered.

Based on this, the present disclosure provides a projection method, an extended reality device, and a non-transitory storage device. By identifying a target object from an image of a real scene, determining a target area according to the target object, and then projecting the projection content of the virtual scene outside the target area, the projection content of the virtual scene can be projected. The projection content of the virtual scene is prevented from blocking the target object that the user is paying attention to or needs to pay attention to in the image of the real scene, thereby improving the user experience and reducing a risk of the user then using the extended reality device.

One embodiment of the projection method of the extended reality device provided by the present disclosure will be described below.

Figure 4:
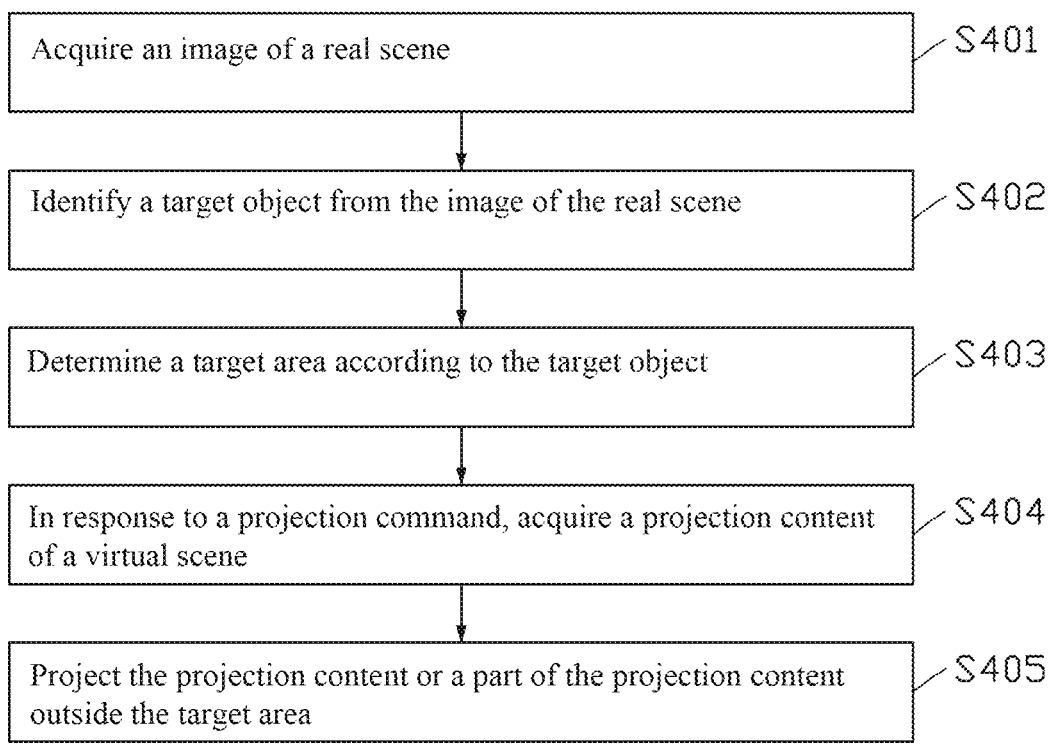
FIG. 4 is a flowchart of one embodiment of a projection method of the extended reality device provided by the present disclosure.

FIG. 4 is a flowchart of one embodiment of the projection method of the extended reality device provided by the present disclosure.

It can be understood that the projection method can be applied to the extended reality device 100. As shown in FIG. 4, the projection method may include the following blocks:

S401, the extended reality device 100 acquires an image of a real scene.

In this embodiment, the extended reality device 100 may obtain the image of the real scene by controlling the camera 140 to capture the image of the real scene.

S402, the extended reality device 100 identifies a target object from the image of the real scene.

The target object may include at least one object that the user is paying attention to or needs to pay attention to. For example, please refer to the schematic diagrams of the real scene shown in FIG. 2A and FIG. 3A, the target object in the real scene shown in FIG. 2A includes the people that the user is paying attention to, and the target object in the real scene shown in FIG. 3A includes the vehicle and the pedestrian on the road.

It can be understood that the target object can include one or more objects.

In some embodiments, the extended reality device 100 may use a feature matching method to identify the target object from the image of the real scene.

Specifically, the extended reality device 100 can first identify a target feature from the image of the real scene, and then compare the target feature with a feature of a preset scene type, so as to determine a preset scene type corresponding to the target feature, the preset scene type corresponding to one or more objects; then, determining the target object corresponding to the preset scene type by searching a target object database according to the preset scene type, and the target object database stores information of objects corresponding to each of a plurality of preset scene types.

It can be understood that each of the plurality of preset scene types can be set as required. For example, the plurality of preset scene types may include an indoor scene type and an outdoor scene type, wherein the indoor scene type may include a scene type of a restaurant, a scene type of a conference room, etc., and the outdoor scene type may include a scene type of a road, a scene type of a park, etc.

S403, the extended reality device 100 determines a target area according to the target object.

Among them, the target area is an area covered by the target object in the image of the real scene.

In some embodiments, the extended reality device 100 may determine the target area according to a contour of the target object by using a method of connected area analysis.

It can be understood that a connected area refers to an area composed of adjacent pixel points with same pixel value in the image, and the connected area analysis refers to marking connected areas that are independent of each other in the image.

Specifically, the extended reality device 100 can first convert the image of the real scene into a binary image, and then perform a connected area analysis on the binary image to mark a contour of the target object in the binary image, so as to determine the target area according to the contour of the target object.

S404, in response to a projection command, the extended reality device 100 acquires a projection content of a virtual scene.

The projection instruction is used to instruct the extended reality device 100 to project the projection content of the virtual scene. The projection content may include two-dimensional or three-dimensional images.

In some embodiments, the extended reality device 100 may include a touch module and/or a voice module. Wherein, the touch module may include keys or ouch devices. The user can trigger the projection command by pressing a projection button, or can trigger the projection command by clicking or long pressing the touch device. The voice module can receive the voice signal (such as "projection") input by the user, and then trigger the projection command through the voice signal.

In other embodiments, the extended reality device 100 may receive the projection command from an external device. For example, the external device may include a control panel, the user may first trigger a projection command by touching a projection control on the control panel of the external device, and then the external device sends the projection command to the extended reality device 100.

In this embodiment, in response to the projection command, the extended reality device 100 may acquire the projection content of the virtual scene from the processor 110 or the storage device 120 or the external device through the projection device 130.

Specifically, the external device sends the projection content of the virtual scene to the extended reality device 100, and the extended reality device 100 may first receive the projection content through the processor 110 or the projection device 130. After the extended reality device 100 receives the projection content through the processor 110, the projection content may be sent to the storage device 120 or the projection device 130 through the processor 110. After the extended reality device 100 sends the projection content to the storage device 120 through the processor 110, the projection content may be stored in the storage device 120, and then the projection content may be retrieved from the storage device 120 through the projection device 130.

S405, the extended reality device 100 projects the projection content or a part of the projection content outside the target area.

In this embodiment, after acquiring the projection content of the virtual scene, the extended reality device 100 projects the projection content or a part of the projection content outside the target area using the projection device 130, thereby preventing the projection content of the virtual scene from blocking the target object corresponding to the target area.

Figure 5:
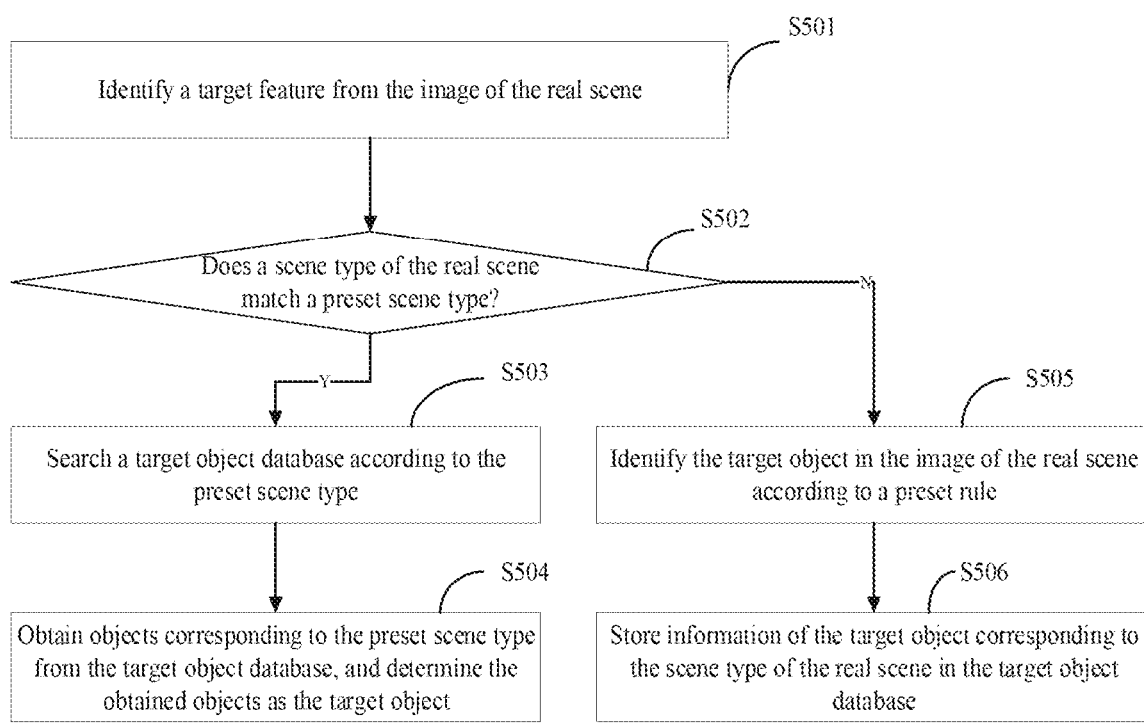
FIG. 5 illustrates one embodiment of sub-blocks of block S402 shown in FIG. 4.

FIG. 5 illustrates sub-blocks of block S402 shown in FIG. 4.

As shown in FIG. 5, the identifying of the target object from the image of the real scene may include the following blocks:

S501, the extended reality device 100 identifies a target feature from the image of the real scene.

Wherein, the target feature may include various objects in the image of the real scene, such as the people, a cup, a coaster, a table, etc. shown in FIG. 2A.

It can be understood that the target feature is related to the scene type. For example, in a scene type of the restaurant, the target feature may include people, tables, seats, and dishes. For another example, in a scene type of the road, the target feature may include vehicles, pedestrians, traffic lights, and zebra crossings. For another example, in the scene type of the conference room, the target feature may include people, a whiteboard or a projection screen, a table, one or more notepads or notebook computers, and the like.

In some embodiments, the extended reality device 100 may perform feature detection on the image of the real scene to determine the target feature.

S502, the extended reality device 100 determines whether a scene type of the real scene matches a preset scene type according to the target feature.

In some embodiments, the extended reality device 100 may determine whether the scene type of the real scene matches the preset scene type by performing feature matching on the target feature in the image of the real scene and a feature in the preset scene type.

In this embodiment, if the scene type of the real scene matches the preset scene type, blocks S503 to S504 are executed; if the scene type of the real scene does not match the preset scene type, blocks S505 to S506 are executed.

S503, if the scene type of the real scene matches the preset scene type, the extended reality device 100 searches a target object database according to the preset scene type.

Wherein, the target object database stores information of objects corresponding to the preset scene type. The information of objects may include information such as a name, a shape, and a color of the object.

S504, the extended reality device 100 determines the objects corresponding to the preset scene type as the target object.

The extended reality device 100 obtains the objects corresponding to the preset scene type from the target object database, and determines the obtained objects as the target object.

In this embodiment, if the scene type of the real scene matches the preset scene type, the extended reality device 100 searches the target object database according to the preset scene type, and obtains objects corresponding to the preset scene type from the target object database.

S505, if the scene type of the real scene does not match the preset scene type, the extended reality device 100 identifies the target object n the image of the real scene according to a preset rule.

Among them, the preset rule is used to define the target object in real scene according to the target feature.

For example, referring to FIG. 2A again, the target feature of the real scene may include people, one or more dining table, one or more seats, one or more dishes, and the like. The preset rule includes defining the people as the target object.

S506, the extended reality device 100 stores information of the target object corresponding to the scene type of the real scene in the target object database.

In this embodiment, if the scene type of the real scene does not match the preset scene type, the extended reality device 100 identifies the target object in the image of the real scene according to the preset rule, and stores the information of the target object corresponding to the scene type of the real scene to the target object database.

It can be understood that, in other embodiments, the extended reality device 100 may not perform block S506.

Figure 6:
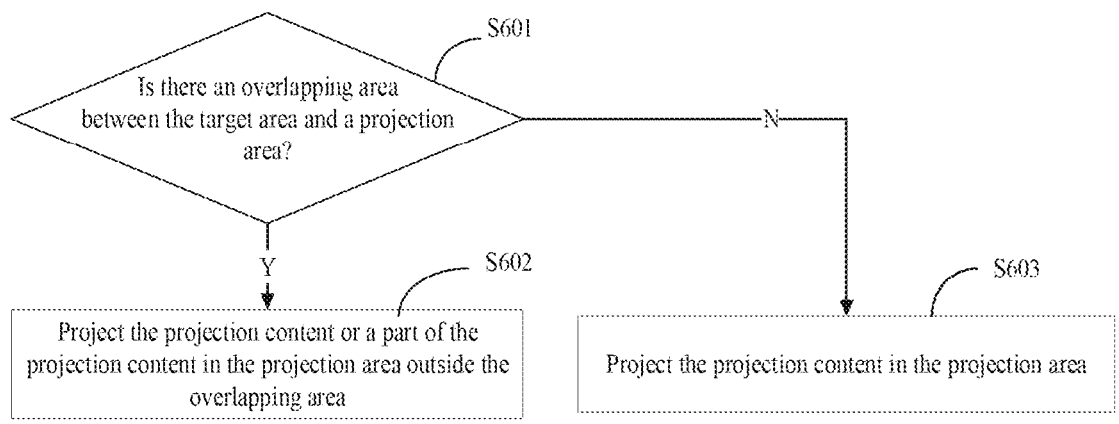
FIG. 6 illustrates one embodiment of sub-blocks of block S405 shown in FIG. 4.

FIG. 6 illustrates one embodiment of sub-blocks of block S405 shown in FIG. 4.

As shown in FIG. 6, the projecting of the projection content or a part of the projection content outside the target area may include the following blocks:

S601, the extended reality device 100 determines whether there is an overlapping area between the target area and a projection area.

In some embodiments, the extended reality device 100 may apply the method of connected area analysis, first determine an image display area according to a contour of the image of the real scene, and then determine the target area in the image display area according to the contour of the target object in the image of the real scene, and determine the projection area according to a contour of the projection content. The image display area refers to an area covered by the image of the real scene, and the projection area refers to an area covered by the projection content.

It can be understood that a position and a size of the image display area are determined by the processor 110, and the position and the size of the image display area can be changed by adjusting image display parameters of the processor 110. A position and a size of the projection area are determined by the processor 110 and/or the projection device 130, and a position and a size of the projection area can be changed by adjusting parameters of the projection device 130. Wherein, a range of the projection area is less than or equal to a range of the image display area.

In this embodiment, if there is an overlapping area between the target area and the projection area, block S602 is performed; if there is no overlapping area between the target area and the projection area, block S603 is performed.

S602, the extended reality device 100 projects the projection content or a part of the projection content in the projection area outside the overlapping area.

In some embodiments, when there is the overlapping area between the target area and the projection area, the extended reality device 100 projects the projection content in the projection area outside the overlapping area by adjusting a projection position of the projection content or adjusting a size of the projection content via the processor 110 and/or the projection device 130, so that when the projection content is projected to the projection area outside the overlapping area through the projection device 130, the projection content is prevented from blocking the target object or block a part of the target object.

In other embodiments, when there is the overlapping area between the target area and the projection area, the extended reality device 100 projects the projection content in the projection area outside the overlapping area by adjusting the contour of the projection content according to an contour of the overlapping area via the processor 110 and/or the projection device 130, so that the projection content can avoid blocking the target object or a part of the target object.

S603, the extended reality device 100 projects the projection content in the projection area.

In this embodiment, if there is no overlapping area between the target area and the projection area, indicating that the projection content will not block the target object, the extended reality device 100 projects the projection content in the projection area.

The exemplary projection method of the extended reality device provided by the present disclosure will be specifically described below by taking a third scene as an example.

Figure 7A:
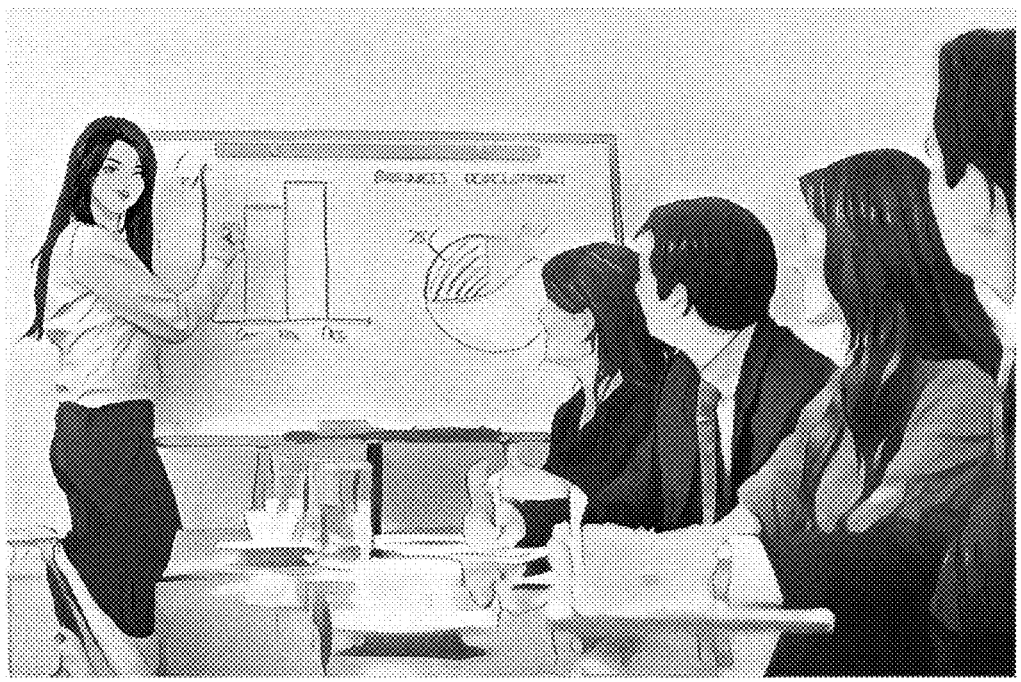
FIG. 7A is a schematic diagram of one embodiment of a real scene in a third scene.
Figure 7B:
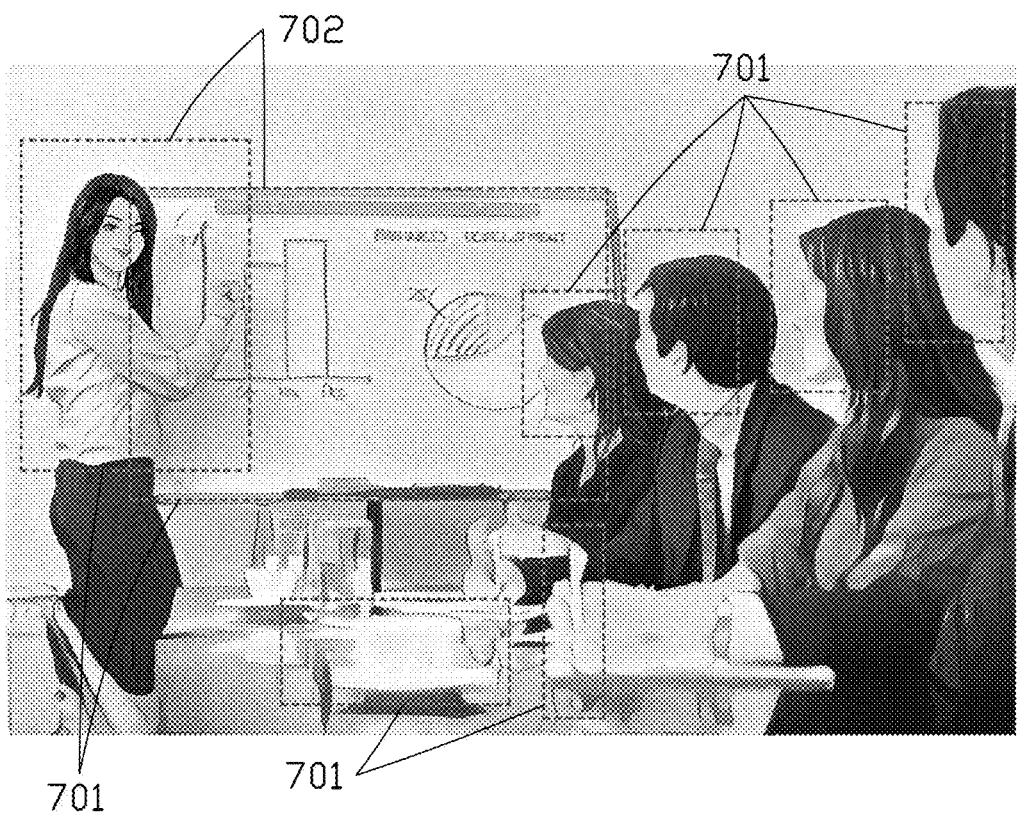
FIG. 7B is a schematic diagram of one embodiment of identifying a target object from an image of the real scene in the third scene.
Figure 7C:
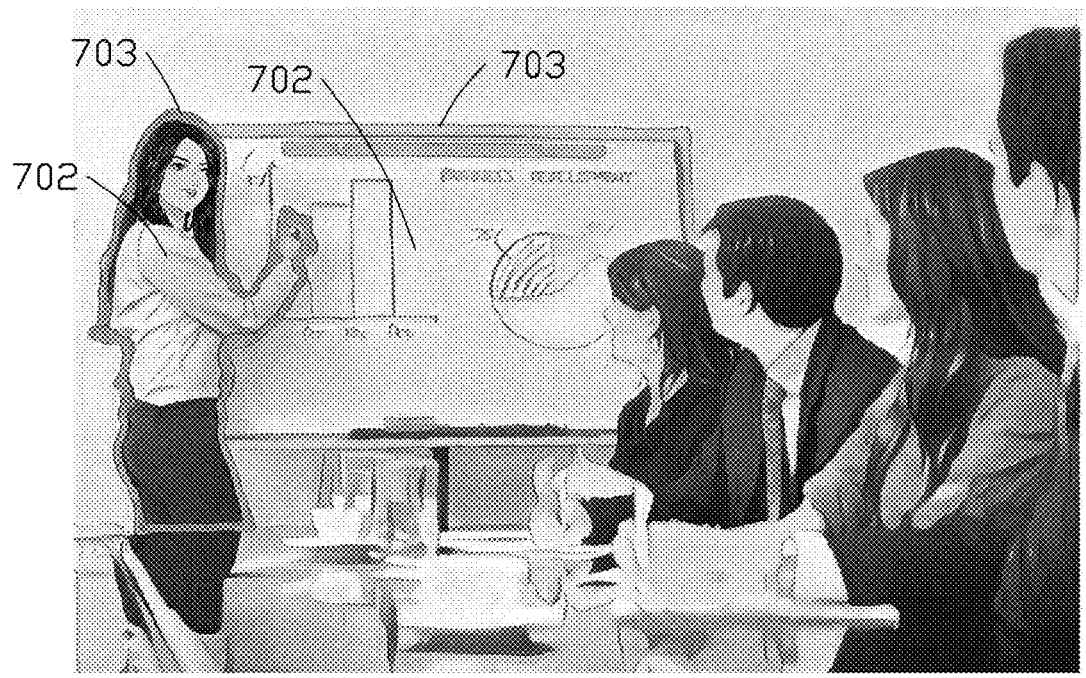
FIG. 7C is a schematic diagram of one embodiment of determining a target area according to the target object in the third scene.
Figure 7D:
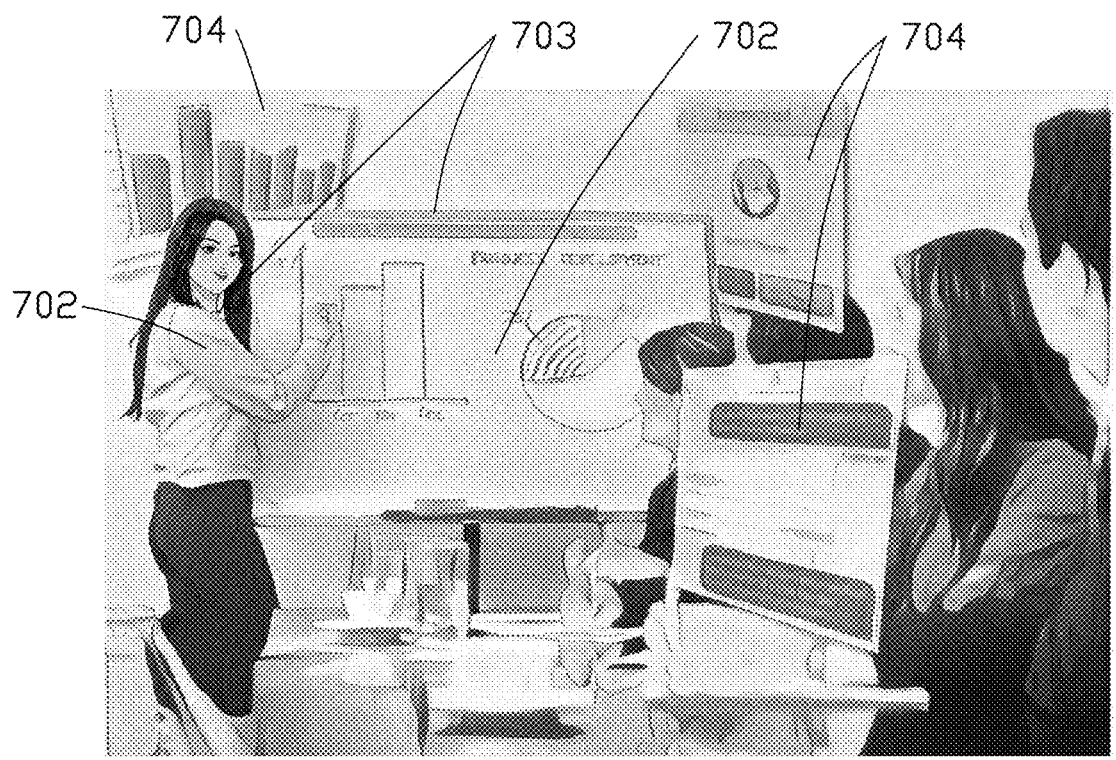
FIG. 7D is a schematic diagram of one embodiment of projecting a projection content outside the target area in the third scene.

Third Scene:

Refer to FIG. 7A to FIG. 7D, wherein, FIG. 7A is a schematic diagram of one embodiment of a real scene, FIG. 7B is a schematic diagram of one embodiment of identifying a target object from an image of a real scene, FIG. 7C is a schematic diagram of one embodiment of determining a target area according to the target object, and FIG. 7D is a schematic diagram of one embodiment of projecting projection content outside the target area.

First, the extended reality device 100 may capture an image of a real scene through the camera 140, thereby acquiring the image of the real scene. As shown in FIG. 7A, the scene type of the real scene is the scene type of the conference room, and the image of the real scene include a conference host, participants, a whiteboard, cups, pens, and a table.

Then, the extended reality device 100 can identify the target object from the image of the real scene through the processor 110. Specifically, the extended reality device 100 can first identify the target feature from the image of the real scene through the processor 110, and then compare the target feature with the feature of the preset scene type, so as to determine the preset scene type corresponding to the target feature. It is assumed that the scene type may include one or more objects; then, the target object database is searched according to the preset scene type, and the target object database stores the information of objects corresponding to a plurality of preset scene types, so as to determine the corresponding objects of the preset scene type. As shown in FIG. 7B, the target feature 701 in the image of the real scene includes a conference host, participants, a whiteboard, cups and pens, the preset scene type corresponding to the target feature 701 is the scene type of the conference room, and the target object 702 corresponding to the preset scene type includes the conference host and the whiteboard.

Next, the extended reality device 100 may determine the target area according to the target object through the processor 110. Specifically, the extended reality device 100 can first convert the image of the real scene into a binary image through the processor 110, and then perform a connected area analysis on the binary image to mark a contour of the target object in the binary image, so as to identify the target area according to the contour of the target object. As shown in FIG. 7C, the target area 703 includes an area covered by the conference host and an area covered by the whiteboard.

Finally, the extended reality device 100 can obtain the projection content of the virtual scene from the processor 110 or the storage device 120 or the external device through the projection device 130, and then project the projection content or a part of the projection content of the virtual scene outside the target area through the projection device 130. As shown in FIG. 7D, the projection content 704 of the virtual scene includes a chart frame, an incoming call prompt frame and a message prompt frame. The projection content 704 of the virtual scene is displayed outside the target area 703 and does not block the target object 702 in the target area 703.

An embodiment of the present disclosure further provides a computer-readable storage medium for storing one or more computer programs or program codes, and when the computer programs or program codes is executed by a processor, the projection method of the embodiment of the present disclosure is implemented.

It is to be understood that computer-readable storage medium includes volatile storage medium and non-volatile storage medium, removable storage media, non-removable storage media implemented in any method or technology for storage of information such as computer-readable instructions, data structures, program modules or other data. The computer-readable storage media includes, but is not limited to, a random access memory (RAM), a read-only memory (ROM), an electrically erasable programmable read-only memory (EEPROM), a flash memory or other memory, a compact disc read-only memory (CD-ROM), a digital versatile disc (DVD) or other optical disk storage, magnetic cartridge, magnetic tape, magnetic disk storage or other magnetic storage device, or any other medium that can be used to store desired information and that can be accessed by a computer device.

The embodiments of the present disclosure have been described in detail above in conjunction with the accompanying drawings, but the present disclosure is not limited to the above-mentioned embodiments, and within the scope of knowledge possessed by those of ordinary skill in the art, various change can also be made without departing from the purpose of the present disclosure.

What is claimed is:

1. A projection method applied to an extended reality device, the method comprising:
   acquiring an image of a real scene;
   identifying a target feature from the image of the real scene;
   determining a scene type of the real scene being one of a plurality of preset scene types according to the target feature, the target feature comprising objects in the image of the real scene, the plurality of preset scene types comprising an indoor scene type and an outdoor scene type;
   determining a target object corresponding to the one of the plurality of preset scene types;
   determining a target area according to the target object;
   in response to a projection command, acquiring a projection content of a virtual scene; and
   projecting the projection content or a part of the projection content outside the target area.

2. The projection method according to claim 1, wherein determining the target object corresponding to the one of the plurality of preset scene types comprises:
   in response that the scene type of the real scene is the one of the plurality of preset scene types, searching a target object database according to the one of the plurality of preset scene types, the target object database storing information of objects corresponding to the one of the plurality of preset scene types, the information of objects comprising a name, a shape, and a color of each of the objects corresponding to the one of the plurality of preset scene types; and
   determining the objects corresponding to the one of the plurality of preset scene types as the target object.

3. The projection method according to claim 2, further comprising:
   in response that the scene type of the real scene does not match the one of the plurality of preset scene types, identifying the target object in the image of the real scene according to a preset rule; and
   storing information of the target object corresponding to the scene type of the real scene in the target object database.

4. The projection method according to claim 1, wherein the projecting of the projection content or the part of the projection content outside the target area comprises:
   determining whether there is an overlapping area between the target area and a projection area;
   in response that there is the overlapping area between the target area and the projection area, projecting the projection content or the part of the projection content in the projection area outside the overlapping area.

5. The projection method according to claim 4, further comprising:
   in response that there is no overlapping area between the target area and the projection area, projecting the projection content in the projection area.

6. The projection method according to claim 1,
   wherein the image of the real scene is acquired by using a camera;
   wherein the indoor scene type comprises a scene type of a restaurant, and a scene type of a conference room, and the outdoor scene type comprises a scene type of a road, a scene type of a park;
   wherein in the scene type of the restaurant, the target feature comprises people, tables, seats, and dishes; in the scene type of the road, the target feature comprises vehicles, pedestrians, traffic lights, and zebra crossings; in the scene type of the conference room, the target feature comprises people, a whiteboard or a projection screen, a table, one or more notepads or notebook computers.

7. An extended reality device comprising:
   a storage device;

at least one processor;
a projection device;
a camera; and
the storage device storing one or more programs, which when executed by the at least one processor, cause the at least one processor to:
acquire an image of a real scene using the camera;
identify a target feature from the image of the real scene;
determine a scene type of the real scene being one of a plurality of preset scene types according to the target feature, the target feature comprising objects in the image of the real scene, the plurality of preset scene types comprising an indoor scene type and an outdoor scene type;
determine a target object corresponding to the one of the plurality of preset scene types;
determine a target area according to the target object;
in response to a projection command, acquire a projection content of a virtual scene; and
project the projection content or a part of the projection content outside the target area using the projection device.

8. The extended reality device according to claim 7, wherein the at least one processor determines the target object corresponding to the one of the plurality of preset scene types by:
in response that the scene type of the real scene is the one of the plurality of preset scene types, searching a target object database according to the one of the plurality of preset scene types, the target object database storing information of objects corresponding to the one of the plurality of preset scene types, the information of objects comprising a name, a shape, and a color of each of the objects corresponding to the one of the plurality of preset scene types; and
determining the objects corresponding to the one of the plurality of preset scene types as the target object.

9. The extended reality device according to claim 8, wherein the at least one processor is further caused to:
in response that the scene type of the real scene does not match the one of the plurality of preset scene types, identify the target object in the image of the real scene according to a preset rule; and
store information of the target object corresponding to the scene type of the real scene in the target object database.

10. The extended reality device according to claim 7, wherein the at least one processor projects the projection content or the part of the projection content outside the target area by:
determining whether there is an overlapping area between the target area and a projection area;
in response that there is the overlapping area between the target area and the projection area, projecting the projection content or the part of the projection content in the projection area outside the overlapping area using the projection device.

11. The extended reality device according to claim 10, wherein the at least one processor is further caused to:
in response that there is no overlapping area between the target area and the projection area, project the projection content in the projection area using the projection device.

12. A non-transitory storage medium having stored thereon at least one computer-readable instructions, which when executed by a processor of an extended reality device, causes the processor to perform a projection method, wherein the method comprises:
acquiring an image of a real scene;
identifying a target feature from the image of the real scene;
determining a scene type of the real scene being one of a plurality of preset scene types according to the target feature, the target feature comprising objects in the image of the real scene, the plurality of preset scene types comprising an indoor scene type and an outdoor scene type;
determining a target object corresponding to the one of the plurality of preset scene types;
determining a target area according to the target object;
in response to a projection command, acquiring a projection content of a virtual scene; and
projecting the projection content or a part of the projection content outside the target area.

13. The non-transitory storage medium according to claim 12, wherein determining the target object corresponding to the one of the plurality of preset scene types comprises:
in response that the scene type of the real scene is the one of the plurality of preset scene types, searching a target object database according to the one of the plurality of preset scene types, the target object database storing information of objects corresponding to the one of the plurality of preset scene types, the information of objects comprising a name, a shape, and a color of each of the objects corresponding to the one of the plurality of preset scene types; and
determining the objects corresponding to the one of the plurality of preset scene types as the target object.

14. The non-transitory storage medium according to claim 13, wherein the method further comprises:
in response that the scene type of the real scene does not match the one of the plurality of preset scene types, identifying the target object in the image of the real scene according to a preset rule; and
storing information of the target object corresponding to the scene type of the real scene in the target object database.

15. The non-transitory storage medium according to claim 12, wherein the projecting of the projection content or the part of the projection content outside the target area comprises:
determining whether there is an overlapping area between the target area and a projection area;
in response that there is the overlapping area between the target area and the projection area, projecting the projection content or the part of the projection content in the projection area outside the overlapping area.

16. The non-transitory storage medium according to claim 15, wherein the method further comprises:
in response that there is no overlapping area between the target area and the projection area, projecting the projection content in the projection area.

17. The non-transitory storage medium according to claim 12,
wherein the image of the real scene is acquired by using a camera;
wherein the indoor scene type comprises a scene type of a restaurant, and a scene type of a conference room, and the outdoor scene type comprises a scene type of a road, a scene type of a park;
wherein in the scene type of the restaurant, the target feature comprises people, tables, seats and dishes; in the scene type of the road, the target feature comprises vehicles, pedestrians, traffic lights, and zebra crossings; in the scene type of the conference room, the target feature comprises people, a whiteboard or a projection screen, a table, one or more notepads or notebook computers.

* * * * *